(12) United States Patent
Speidel et al.

(10) Patent No.: US 9,046,388 B2
(45) Date of Patent: *Jun. 2, 2015

(54) DEVICE AND PROCESS FOR MEASURING THE ANGLE OF ROTATION OF TWO OBJECTS ROTATING IN RELATION TO EACH OTHER

(75) Inventors: Michael Speidel, Freiburg (DE); Mark Johnson, Wetheral (GB)

(73) Assignee: SICK STEGMANN GMBH, Donaueschingen (DE)

( * ) Notice: Subject to any disclaimer, the term of this patent is extended or adjusted under 35 U.S.C. 154(b) by 232 days.

This patent is subject to a terminal disclaimer.

(21) Appl. No.: 13/469,695

(22) Filed: May 11, 2012

(65) Prior Publication Data
US 2012/0287436 A1     Nov. 15, 2012

(30) Foreign Application Priority Data

May 13, 2011   (EP) ..................................... 11003980

(51) Int. Cl.
G01J 4/00       (2006.01)
G01D 5/347      (2006.01)
G01D 5/34       (2006.01)

(52) U.S. Cl.
CPC .............. *G01D 5/3473* (2013.01); *G01D 5/345* (2013.01)

(58) Field of Classification Search
CPC . G01D 5/345; G01D 5/3473; G01D 5/34715; G01B 11/26
USPC ........................ 356/364–370, 138; 250/231.13
See application file for complete search history.

(56) References Cited

U.S. PATENT DOCUMENTS

| | | | |
|---|---|---|---|
| 3,306,159 A * | 2/1967 | Beall, Jr. et al. | 250/225 |
| 5,410,532 A * | 4/1995 | Ono et al. | 369/112.16 |
| 6,049,377 A * | 4/2000 | Lau et al. | 356/73 |
| 7,089,672 B2 * | 8/2006 | Noltemeyer | 33/1 PT |
| 7,372,568 B1 * | 5/2008 | Yao | 356/369 |
| 2005/0002032 A1 * | 1/2005 | Wijntjes et al. | 356/364 |
| 2010/0290713 A1 * | 11/2010 | Kanamori et al. | 382/254 |

FOREIGN PATENT DOCUMENTS

| | | |
|---|---|---|
| DE | 201 02 192 U1 | 6/2001 |
| EP | 0 718 600 A1 | 6/1996 |
| EP | 0 779 499 A2 | 6/1997 |

OTHER PUBLICATIONS

Search Report issued by the European Patent Office on Oct. 10, 2011, in parallel pending European Patent Application No. 11003980.7.

* cited by examiner

*Primary Examiner* — Kara E Geisel
*Assistant Examiner* — Dominic J Bologna
(74) *Attorney, Agent, or Firm* — Nath, Goldberg & Meyer; Jerald L. Meyer; Tiffany A. Johnson (57) ABSTRACT

Measurement of the rotating angle of two objects rotating in relation to each other is achieved with a transmitter assigned to one of the objects. The transmitter emits light that is either polarized or becomes polarized by means of a polarization filter, and with a polarization-sensitive polarizer such that the transmitter and the polarizer rotate relative to each other as dependent on the rotating angle. A receiver measures the luminosity of light passing through the polarizer in order to create a signal that is dependent on the rotating angle, and where the receiver has at least two receiver elements which detect light of differing polarization.

14 Claims, 7 Drawing Sheets

DEVICE AND PROCESS FOR MEASURING THE ANGLE OF ROTATION OF TWO OBJECTS ROTATING IN RELATION TO EACH OTHER

FIELD OF THE INVENTION

The invention relates to a device for measuring the angle of rotation of two objects rotating in relation to each other, in accordance with the preamble of claim 1, and to a process for measuring the angle of rotation of two objects rotating in relation to each other, in accordance with the preamble of claim 13.

BACKGROUND OF THE INVENTION

For many applications, it is of basic importance to measure the angle of rotation of the rotating object. In general, the rotating angle of the rotating object is measured in relation to a stationary object, to which a measuring unit is attached. For example, the rotating object may be one that turns with the rotating wheel of a motor relative to a stationary machine part. The measuring unit may be both incremental and absolute. Here it is desirable to perform a measurement that is as insensitive to tolerance as possible, but one that also has a high degree of accuracy. In the ideal case, the measurement is performed without contact, in order to avoid mechanical wear.

EP 2 187 178 A1 discloses a principle of measurement that uses the optical polarization of light. To measure the rotating angle of two objects rotating opposite each other, a transmitter emits at least two light rays that are polarized in linear fashion and whose polarization planes are rotated in relation to each other. The luminosity of the light rays is modulated in phase-shifted fashion, each relative to the other. The light passes through a polarization filter, which rotates opposite the transmitter, as dependent on the rotating angle. The luminosity of the light passing through the polarization filter is measured by a receiver and is evaluated or plotted as a signal dependent on the rotating angle. The disclosed device is therefore based on both the electrical and the optical modulation of a transmission signal coming from a number of electric light sources. A disadvantage of this device derives from the use of a plurality of light transmitters, both because the reception signal can only be reduced to a linear relationship to the rotating angle when all light sources shine with precisely the same mathematical luminosity, and because productions costs are increased by the use of several light sources. If the distance between the objects rotating relative to each other undergoes changes during a rotation due to the axial tolerances of the shaft, the change in angle results in amplitude fluctuations in the signal, thereby leading to angular errors. This is conditioned by the fact that polarization is also dependent on the light ray's angle of incidence upon the surface of a polarizer—which means that a large and desirable axial tolerance in the range greater than one millimeter can be partially lost.

The goal of the invention, therefore, is to specify an improved device for measuring the rotating angle of two objects rotating relative to each other, as well to specify an improved process for measuring the rotating angle of two objects rotating relative to each other, such that both device and process provide a savings in cost.

The goal of the invention is achieved by a device with the features of patent claim 1 and by a process with the features of patent claim 13.

Advantageous embodiments and elaborations of the invention are indicated in the dependent claims.

The device according to the invention for measuring the rotating angle of two objects rotating in relation to each other—with a transmitter which is assigned to one of the objects and which emits light that is either polarized or becomes polarized by means of a polarization filter, and with a polarization-sensitive polarizer, such that the transmitter and the polarizer rotate relative to each other as dependent on the rotating angle, and with a receiver which measures the luminosity of light passing through the polarizer in order to create a signal that is dependent on the rotating angle—is distinguished by the fact that the receiver has at least two reception elements which detect light of differing polarization. The device according to the invention permits the use of both an unpolarized light source, e.g., an LED, whose light is then polarized by a polarizing filter, and a polarized light source, e.g., a laser. Since the differing polarizations are only detected in the receiver, the rotating direction is detected between the rotating object and the receiver—a fact which permits the use of a single light source and which thereby confers on the device a savings in cost. The use of at least two reception elements, and ideally a multitude of reception elements, improves the accuracy in measuring the rotating angle, inasmuch as averaging is performed over different optical channels.

In accordance with a preferred embodiment of the invention, a polarizing filter is positioned in front of each of the reception elements, and the polarization planes of the polarizing filters are rotated relative to each other. Here the number of reception elements specifically determines the number of optical channels. This arrangement can be realized in a cost-effective manner.

In principal, the polarization planes of the reception elements can be rotated at any desired angle, one relative to the other, and in particular, the angles can be taught-in. According to an advantageous embodiment of the invention, the polarization planes of the reception elements are each rotated $180°/n$ relative to the other, where n is the number of reception elements. This provides a uniform distribution over all directions of polarization.

The receiver advantageously exhibits at least one group, and ideally a plurality of groups, with four reception elements each, where the polarization planes of two each of the four reception elements are rotated relative to each other, specifically by 45°. When a number of channels is used, the resolution can be additionally improved by statistical averaging. In particular, it is possible also to teach-in reproducible errors.

When there are large distances between the rotating shaft and the receiver, the aperture can be enlarged by optical imaging systems, and without having to enlarge the costly area of the detectors.

Advantageously positioned in front of the receiver are at least two wedge-shaped optical elements, and ideally a number of wedge-shaped optical reception elements that corresponds to the number of reception elements. The surfaces of these wedge-shaped optical reception elements are positioned at a right angle to each other, and the polarization filters are positioned on these surfaces. Here the polarization planes of the polarization filters are rotated relative to each other. The optical elements guide an incident light ray in different directions. A lens or other imaging element is advantageously provided and focuses the rays in different directions. For example, it is possible to merge the rays running in different directions into focal points arranged on a line. A reception element can be positioned at each focal point, and such elements can be arranged to form a line array. This configuration allows light of differing polarizations to be provided to the different reception elements in a simple manner.

Advantageously positioned in front of the receiver are of strips of polarization filters, specifically N number of strips—whose polarization planes are rotated relative to each other. Positioned on these strips are strips of phase plates, specifically M number of strips—whose phases are each shifted, one relative to the next. These phase plate strips are positioned at a right angle to the polarization filter strips, and this configuration is advantageously placed on a plurality of wedge-shaped optical elements whose surfaces are positioned at a right angle to each other. With this arrangement there arises a plurality—specifically N×M—of different polarization states. Particularly preferred is N=M.

According to a preferred embodiment of the invention, a doubly refracting element, ideally a Wollaston prism, is positioned in front of the receiver, and beyond it there is advantageously placed an imaging lens system. The doubly refracting element produces two light rays having two polarization directions, one perpendicular to the other. The amplitudes of these light rays are dependent on the incident direction of polarization. With the doubly refracting element the total incident luminosity is split—which means that the two perpendicular directions of polarization equally experience fluctuations in the original amplitude. Thus, the configuration makes it possible to scale the signals to the original amplitude. The two perpendicular directions of polarization can be guided to different reception elements, e.g., by the imaging lens system, and this makes it possible to produce two different optical channels in a simple manner. Since the two optical channels differ only by a sign (sin, −sin), at least two prisms, whose optical axes are rotated at an angle one to the other, must be used to determine the position. Otherwise only the rotational speed can be directly obtained from the frequency of the electrical signals (tacho applications).

According to a particularly preferred embodiment of the invention, the polarizer has at least one phase plate, which is ideally designed as a $\lambda/4$ plate or a $\lambda/2$ plate—depending on whether the configuration is operated in transmission or reflection mode. Phase plates are more temperature-stable (frequently up to 200° C.) than organic polarizing films and produce a frequency doubling of the electrical signal. This, in turn, provides an improved angular resolution. Moreover, the transmitted luminosity is greater than that of a linear polarizer, which lets through only half of the luminosity.

The transmitter and the receiver are advantageously supplied with the same electrical modulation frequency in order to reduce sensitivity to electrical offsets, e.g., those caused by interfering light or dark currents.

Advantageously positioned behind the polarizer is a reflector, e.g., a mirror or a diffusely reflecting element, such that the reflector is positioned perpendicular to the rotating axis. The reflector advantageously rotates along with the polarizer. When a reflector is used in combination with a phase plate, a $\lambda/4$ plate is employed, whereas a phase plate of $\lambda/2$ is used for operation in transmission mode without a reflector.

In accordance with an advantageous embodiment of the invention, a beam splitter is positioned in the light path, specifically a beam splitter which does not have a polarizing design and which is provided both to cut out lateral light and to equalize the axial tolerances. Furthermore, a portion of the initial luminosity can be measured in order to identify drifts in the initial amplitude over time and, if necessary, to regulate them.

Advantageously provided are two transmitters, which are symmetrically positioned relative to the optical axis of the receiver and which are provided so as to increase the luminosity striking the receiver and to reduce the angular incidence of the light.

The process according to the invention for measuring the rotating angle between two objects rotating in relation to each other—where a transmitter is assigned to one of the objects and emits light that is either polarized or becomes polarized by means of a polarization filter, such that this light passes through a polarizer and strikes a receiver, and where the transmitter and the polarizer rotate relative to each other as dependent on the rotating angle, and where the luminosity measured by the receiver is plotted as a signal dependent on the rotating angle—is distinguished by the fact that the receiver has at least two reception elements which detect light of differing polarization.

The reception signals of those reception elements which have identical polarization planes are advantageously averaged in order to improve the accuracy of measurement.

According to a preferred embodiment of the invention, the reception signals of those reception elements which have different polarization planes are averaged, with due allowance made for the phase differences.

BRIEF DESCRIPTION OF THE DRAWINGS

The invention is next explained in detail on the basis of the following figures. Shown are.

DETAILED DESCRIPTION OF THE INVENTION

FIG. 1 shows various embodiments of devices for measuring the rotation of two objects rotating in relation to each other. Here only one object has a rotating design, namely a shaft 14, e.g., of a motor. The rotating angle of the shaft 14 is to be determined relative to a stationary part, for example, a motor housing or a stationary machine part. Each of the devices has at least one light source 10, which is in fixed position and can, e.g., be assigned to the stationary part.

Figure 1A:
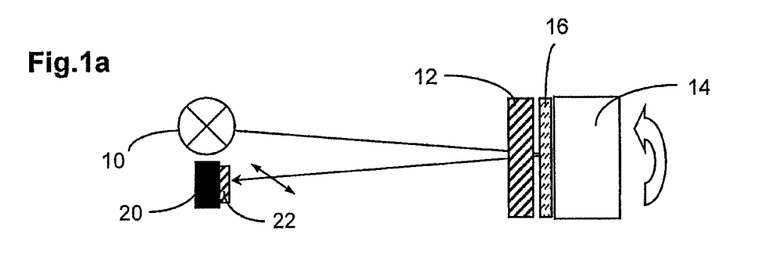
FIG. 1a: a schematic depiction of a device for measuring the rotating angle of two objects rotating relative to each other, in one exemplary embodiment of the invention

According to the exemplary embodiment of the invention shown in FIG. 1a, the light source 10 transmits unpolarized light and is designed, e.g., as a LED. Assigned to the rotating shaft 14 is a reflector 16 which rotates with the shaft 14. Positioned in front of it is a polarization filter 12, which also rotates with the shaft 14. The reflector 16 is designed as a diffusely reflecting element in order to negate the polarization received when the light first passes through the polarization filter 12. Also provided is a receiver 20 with at least two reception elements, by means of which light of varying polarization is detected. To this end, in one embodiment of the invention there are positioned in front of the reception elements polarization filters 22 whose polarization planes are rotated with respect to each other. Various embodiments of the receiver 20 are described below in greater detail. As dependent on the rotating angle of the rotating shaft 14, the luminosity of the light detected in the reception elements varies and is at a maximum when the polarization plane of the polarizer 12 coincides with the polarization plane of the polarization filter 22 of the receiver 20, and is at a minimum when the polarization plane of the polarizer 12 is perpendicular to the polarization plane of the polarization filter 22 of the receiver (cf. FIG. 1c). Thus, the rotating angle can be measured over one half the rotation of the shaft 14 without further auxiliary means. The use of at least two reception elements results in a corresponding number of optical channels that can be plotted and, if necessary, averaged—and this, in turn, permits an improved accuracy in measuring the rotating angle. Here the differing polarization directions are first detected in the reception elements, so that detection of the rotating direction takes place between the rotating shaft 14 and the receiver 20, and this make possible the use of a single light source 10.

Figure 1B:
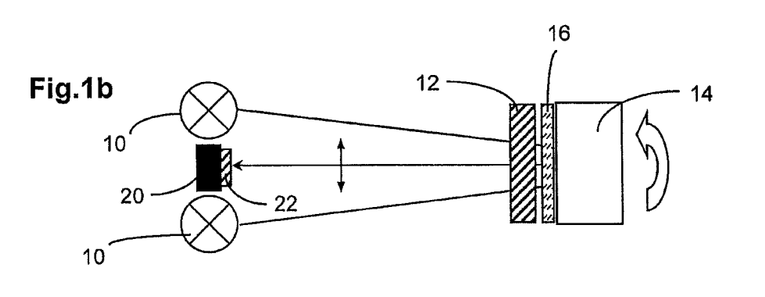
FIG. 1b: a schematic depiction of a device for measuring the rotating angle of two objects rotating relative to each other, in another exemplary embodiment of the invention
Figure 1C:
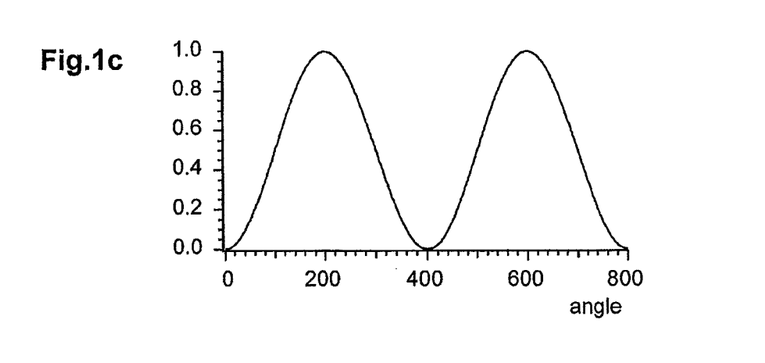
FIG. 1c: a depiction of the amplitude of the light detected by the receiver as dependent on the rotating angle, for the devices according to FIGS. 1a and 1b FIG. 1d: a schematic depiction of a device for measuring the rotating angle of two objects rotating relative to each other, in another exemplary embodiment of the invention FIG. 1e a schematic depiction of a device for measuring the rotating angle of two objects rotating relative to each other, in another exemplary embodiment of the invention FIG. 1f a schematic depiction of a device for measuring the rotating angle of two objects rotating relative to each other, in another exemplary embodiment of the invention FIG. 1g a schematic depiction of a device for measuring the rotating angle of two objects rotating relative to each other, in another exemplary embodiment of the invention FIG. 1h a depiction of the amplitude of the light detected by the receiver as dependent on the rotating angle, for the devices according to FIGS. 1d, 1e, 1f, and 1g FIG. 1i a schematic depiction of a device for measuring the rotating angle of two objects rotating relative to each other, in another exemplary embodiment of the invention FIG. 1j a depiction of the amplitude of the light detected by the receiver as dependent on the rotating angle, for the device according to FIG. 1i FIG. 2 a schematic depiction of an exemplary embodiment of a receiver with a plurality of polarization filters FIG. 3 a schematic depiction of the light path of a device for measuring the rotating angle of two objects rotating relative to each other, in another exemplary embodiment of the invention FIG. 4a a schematic depiction of an exemplary embodiment of a receiver with a doubly refracting element FIG. 4b a schematic depiction of another exemplary embodiment of a receiver with a doubly refracting element FIG. 5 a schematic depiction of another exemplary embodiment of a receiver with wedge-shaped optical elements, and FIG. 6 a schematic depiction of another exemplary embodiment of a receiver with wedge-shaped optical elements and phase plates.
Figure 1D:
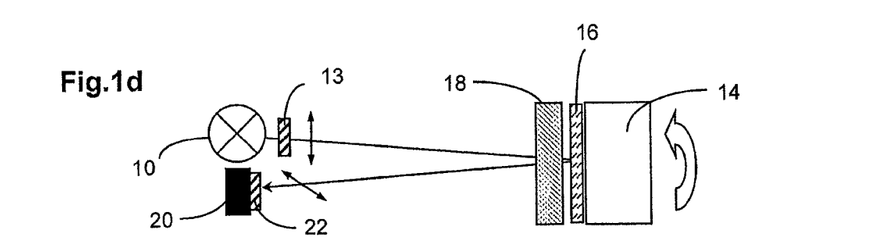
Figure 1E:
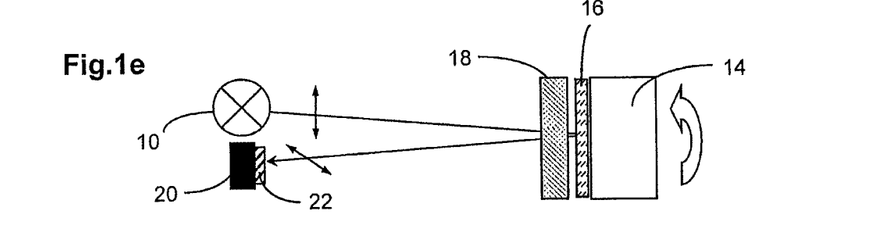
Figure 1F:
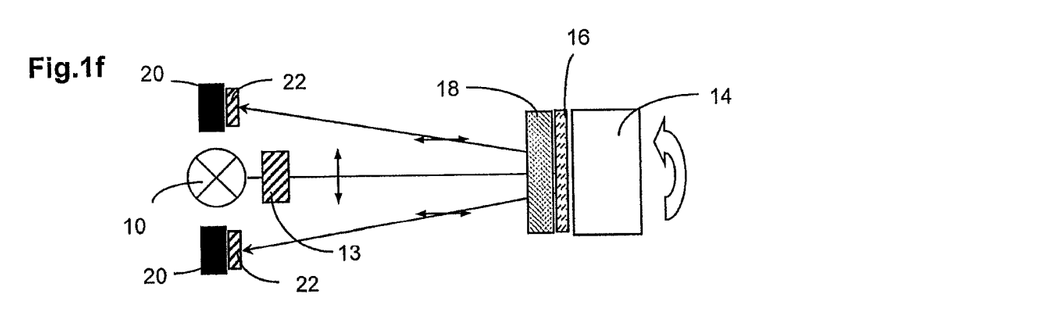
Figure 1G:
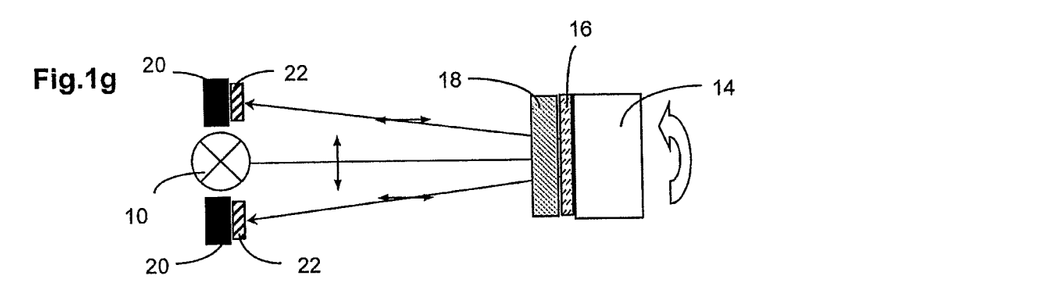
Figure 1H:
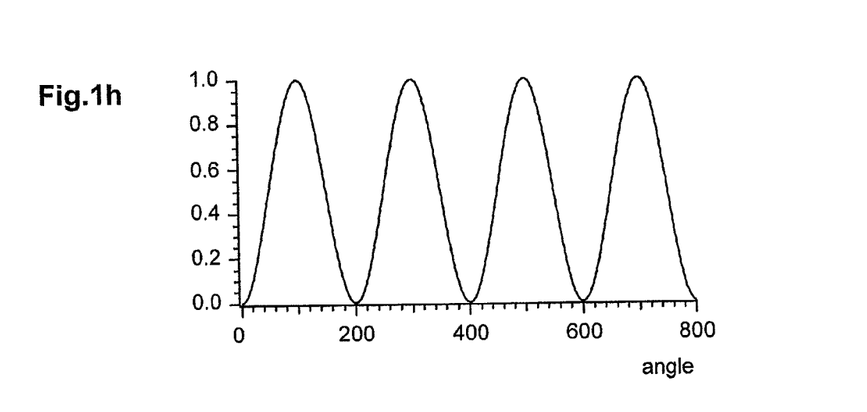

FIG. 1b show another device for measuring the rotating angle of two objects rotating in relation to each other, with an unpolarized light source 10 whose light is polarized by the polarization filter 12 rotating with the shaft 14, and with another polarization filter 22 positioned in front of the receiver 20. Here there is provided a second light source 10, whose position is symmetrical with the optical axis of the receiver 20 and which both provides a symmetrical design and increases the total luminosity of the light falling on the receiver 20. With the device according to FIG. 1b it is also possible to measure the rotating angle over one half the rotation of shaft 14 without further auxiliary means (cf. FIG. 1c).

Shown in FIGS. 1d, 1e, 1f, and 1g are four devices for measuring the rotating angle of two objects rotating in relation to each other. Here a phase plate 18, specifically in the form of a λ/4 plate, is positioned on the rotating shaft 14, in front of the reflector 16. In an arrangement without a reflector 16, where the light source 10 and the receiver 20 are positioned on different sides of the phase plate 18 and where the light consequently passes through the phase plate 18 only once, a λ/2 plate is used instead of the λ/4 plate. The λ/2 or λ/4 plates replace the rotating polarization filter 12 of the devices according to FIGS. 1a and 1b. Phase plates 18 are specifically available in the form of crystals and have a temperature resistance ranging upwards to 200° C. Phase plates 18 have a further advantage in that a frequency doubling is provided, and even though the rotating angle can only be measured over one quarter of the revolution of the shaft 14 without further means (cf. FIG. 1h), the resolution is noticeably enhanced. The reflector 16 in these exemplary embodiments takes the form of a mirror 16, in order to maintain the circular polarization produced by the phase plate 18.

The devices according to FIGS. 1d to 1g differ only in the type of light source 10 employed and in the number and arrangement of the reception elements. While in the devices according to FIGS. 1e and 1g a polarized light source 10 is used, the devices according to FIGS. 1d and 1f have an unpolarized light source, whose light is polarized by another stationary polarization filter 13. Whereas only one receiver 20, with at least two reception elements, is provided in the devices of FIGS. 1d and 1e, the devices according to FIGS. 1f and 1g have two receivers 20, each with at least two reception elements, in order to achieve a symmetrical design.

Figure 1I:
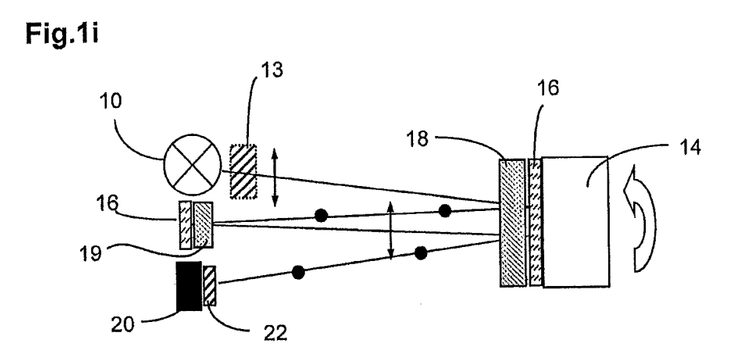
Figure 1J:
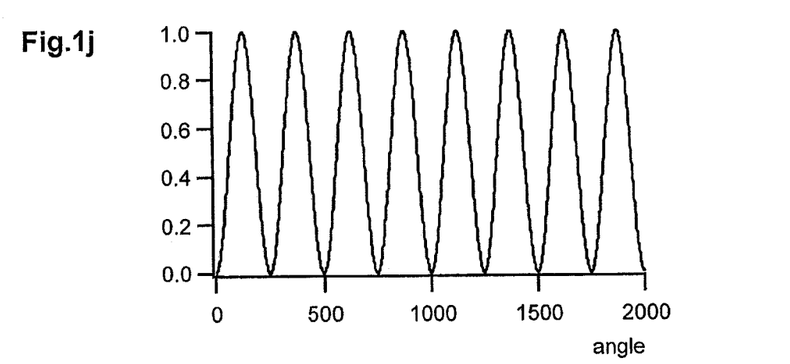

FIG. 1i depicts a device for measuring the rotating angle of two objects rotating in relation to each other, with an unpolarized light source 10. Here there is positioned between a λ/4 plate rotating with the shaft 14 and the receiver 20 another λ/4 plate 19, behind which a second mirror is positioned—so that after the light is reflected from the mirror 16 belonging to the rotating shaft 14, the light passes through the second λ/4 plate 19; is reflected by the mirror 16 positioned behind this λ/4 plate 19; passes once more through the λ/4 plate 19 and strikes the λ/4 plate 18 positioned on the shaft 14; it passes through it and is again reflected by the mirror 16 positioned on the shaft 14; again passes through the λ/4 plate 18 positioned on the shaft 14, and is finally detected in the receiver 20. With this arrangement another frequency doubling is achieved, with the result that the resolution is noticeably enhanced even though the rotating angle can only be measured over one eighth of the revolution of the shaft 14 without further means (cf. FIG. 1j).

In all arrangements of the devices for measuring the rotating angle of two objects rotating in relation to each other it is possible to supply the light source 10 or the light sources 10 and the receiver 20 with the same electrical modulation frequency, in order to make the device less sensitive to electrical offsets caused by interfering light or dark currents. Demodulation using a low-pass filter defines the bandwidth of the device.

An essential component of the various embodiments shown in FIG. 1 for the devices that measure the rotating angle of two objects rotating in relation to each other is the receiver 20, which has at least two reception elements for detecting light of varying polarization. This increases the number of optical channels available for evaluation and improves the accuracy of measurement. In the following, various embodiments of the receiver 20 are described, and each of these described embodiments of the receiver 20 is used in the devices according to FIG. 1 for measuring the rotating angle of two objects rotating in relation to each other.

Figure 2:
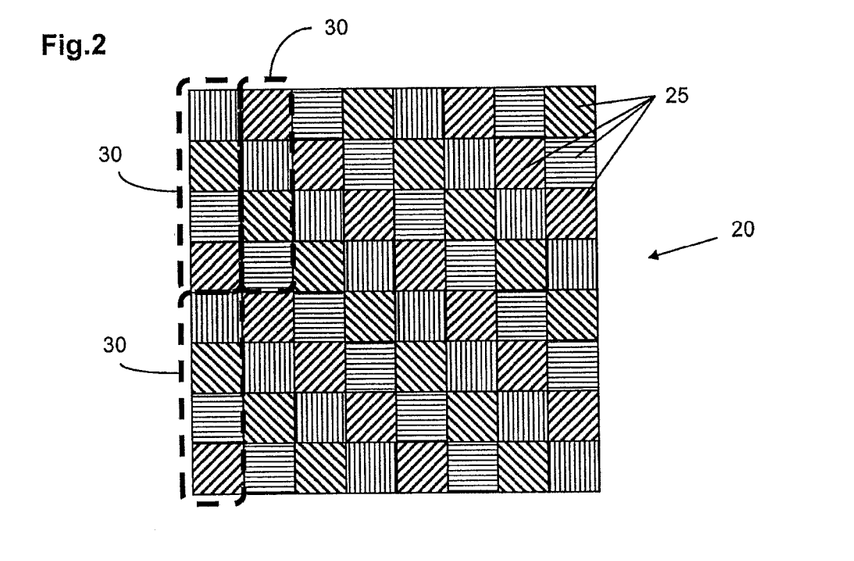

FIG. 2 shows a receiver 20 which has a matrix of arranged reception elements. In particular, 8 reception elements are arranged in 8 rows. Here a polarization filter is positioned in front of each of the reception elements. The polarization filters of adjacent reception elements are rotated in relation to each other.

In principle, it is possible, for n number of reception elements, to rotate the polarization planes of the reception elements by any desired angle, one relative to the other—but ideally by 180°/n, where n is the number of reception elements. As a result, there are n different optical channels. In particular, the desired angles can be taught-in.

As an alternative, it is also possible to provide a plurality of comparable groups of reception elements, within which the polarization planes of every two reception elements are rotated one relative to the other. By providing a number of uniform groups a plurality of channels is provided over which averaging can be performed in order to improve the accuracy of the evaluation. Averaging can also occur over the different optical channels in order to improve the accuracy of measurement, and here the different directions of polarization of the various optical channels must be taken into account. In the present case, the receiver 20 has sixteen groups 30, each with four reception elements 25, and here the polarization planes of two of the four receptions elements 25 are rotated one relative to the other, specifically by 45°. In the other embodiments of the receiver 20, several of the reception elements of the receiver 20 according to FIG. 2 can be covered by a phase plate, e.g., a λ/4 plate, in order to also permit the detection of elliptical or circular polarization.

Figure 3:
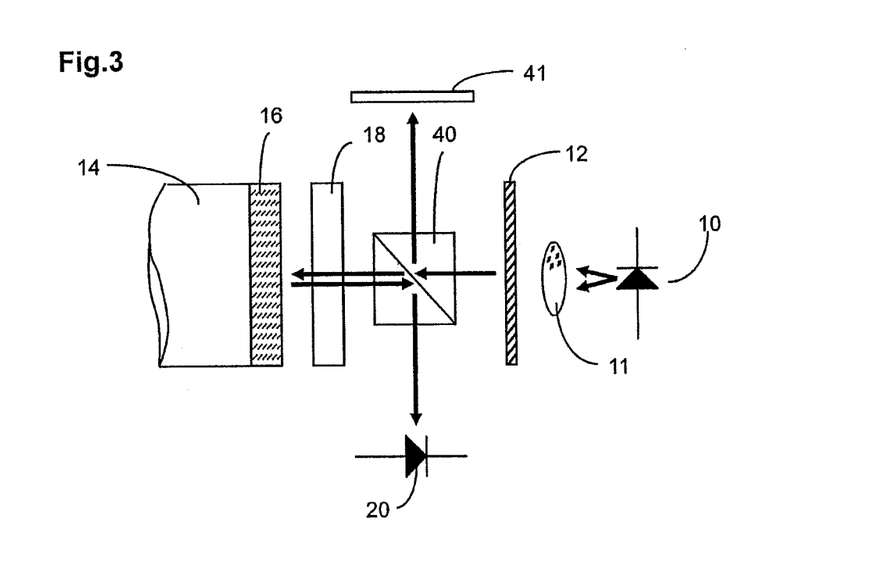

FIG. 3 schematically depicts the light path of another exemplary embodiment of a device for measuring the rotating angle of two objects rotating in relation to each other. The light source 10 takes the form of an unpolarized light source, e.g., an LED. The light emitted by the light source 10 is collimated by a lens 11 and polarized in linear fashion by a polarization filter 12. Positioned on the rotating shaft 14 is a mirror 16 and a λ/4 plate 18, both of which rotate with the shaft 14. The mirror 16 is positioned between the shaft 14 and the λ/4 plate 18. Between the polarization filter 12 and the λ/4 plate 18 there is positioned a beam splitter 40, by means of which the light reflected by the mirror 16 can be decoupled laterally, to be detected by a laterally positioned receiver 20. Here the position of the light source 10 and the receiver 20 can be interchanged. The advantage of this arrangement is that it permits an axial beam trajectory—which means that axial tolerances between the light source 10 and the shaft 14 can be equalized. In addition, a portion of the initial luminosity at the beam splitter 40 can be decoupled and measured, e.g., with a photodiode 41, in order to identify temporal drifts in the initial amplitude and, if need be, control them.

Figure 4A:
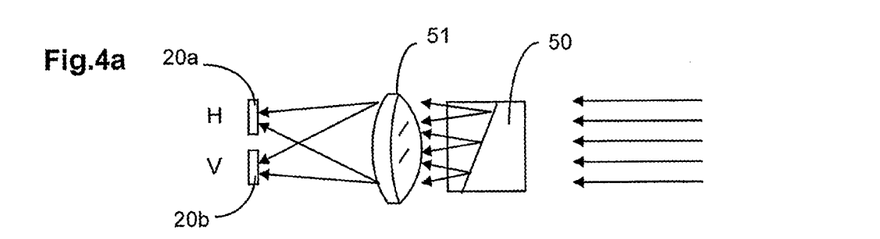
Figure 4B:
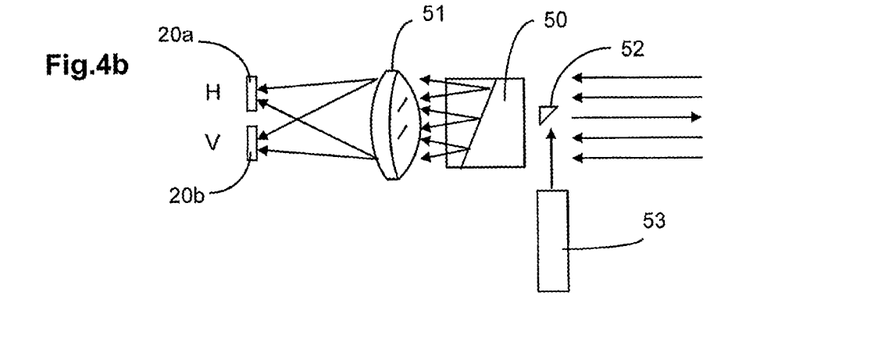

FIG. 4a schematically depicts an alternative possibility for a receiver, one which has at least two reception elements for detecting light of differing polarization. The receiver 20 has two reception elements 20a, 20b. The light of a polarized light source, e.g., a laser 53, first strikes a doubly refracting element, e.g., a Wollaston prism 50. The doubly refracting element divides the polarized beam into two polarization directions that are perpendicular to each other, with amplitudes that depend on the incident direction of polarization. By means of an imaging lens system 51 the light having one direction of polarization is guided to the first reception element 20a, while the light with the polarization direction perpendicular thereto is guided to the other reception element 20b. In this way, the two reception elements 20a, 20b detect light of differing polarization. To obtain a collimated light path, the light of the laser 53 can also be coupled in by means of a mirror 52 (c. FIG. 4b), and this results in a compact design. Not shown is an arrangement without an imaging lens system 51, although this would be possible. In this kind of arrangement, the signals detected by the reception elements 20a, 20b can be represented with standardized amplitudes, inasmuch as the total incident luminosity is divided by the doubly refracting element and consequently both polarization directions undergo fluctuations in the initial amplitude in equal measure.

Figure 5:
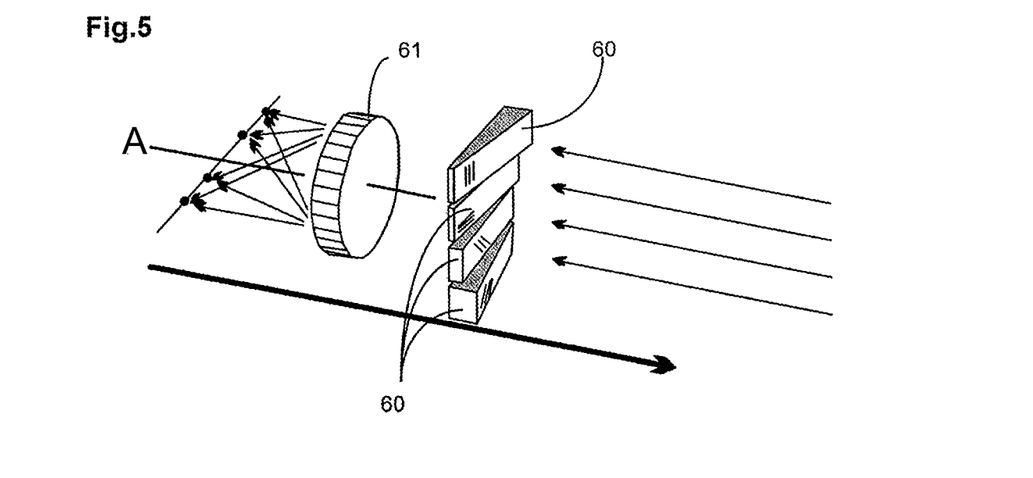

FIG. 5 schematically depicts another alternative embodiment of the receiver 20, with at least two reception elements which detect light of differing polarization. The receiver 20 has a series of reception elements positioned along line A and can therefore be formed by a conventional, cost-effective line array. Positioned in a row 60, in front of the reception elements, are a plurality of wedge-shaped optical elements, whose surfaces are arranged at an angle to each other and which guide a collimated incident light beam in different directions. Positioned between the wedge-shaped elements 60 and the line array is an imaging lens system, specifically a lens 61, which merges the beams running in different directions into focal points positioned on line A, and in such a way that the reception elements are positioned at the focal points. Polarization filters are positioned on the wedge-shaped elements 60, and the polarization planes of the adjacent polarization filters are rotated in relation to each other. The various directions of polarization are thus detected by the different reception elements.

Figure 6:
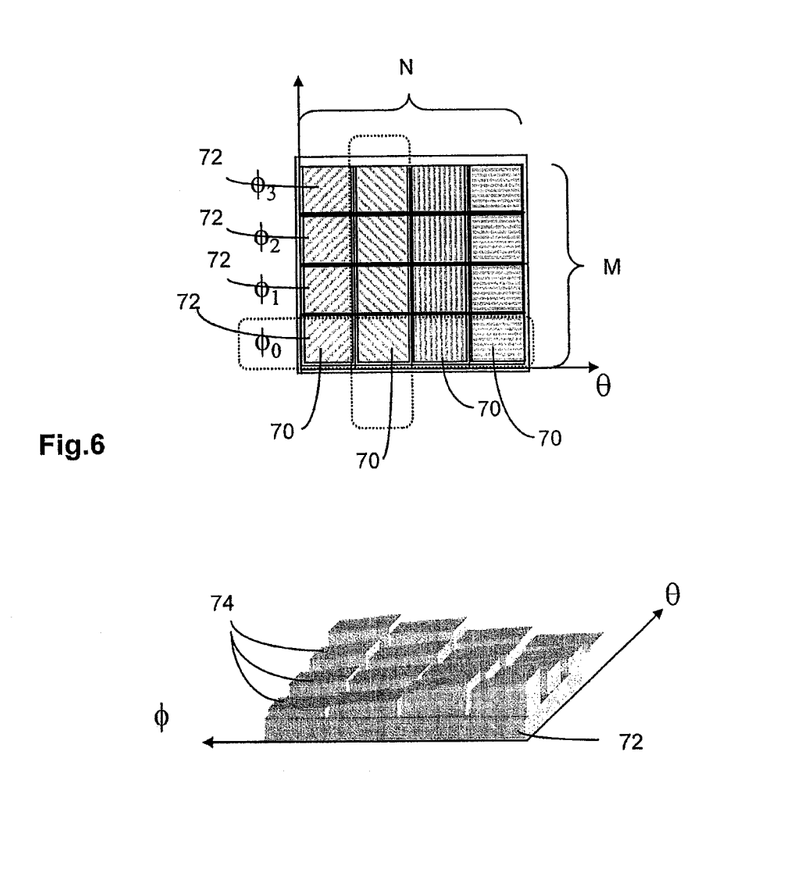

FIG. 6 schematically depicts another alternative embodiment of the receiver 20, which has at least two reception elements for detecting light of varying polarization. Positioned in front of the receiver are a plurality of strips of polarization filters 70 (specifically, N in number), whose polarization planes are rotated in relation to each other. Positioned on these strips are a number of strips of phase plates 72 (specifically, M in number), whose phases are shifted in relation to each other, specifically by an identical phase difference. These strips of phase plates 72 are positioned at a right angle to the strips of polarization filters 70. Consequently, there arise N×M different polarization states. This arrangement is advantageously realized on the reverse side of a plurality of wedge-shaped optical elements 74, whose surfaces are positioned at an angle to each other. A chess-board polarization pattern is thereby created, which can be projected onto N×M reception elements by means of an imaging lens system. In particular, N=M. This kind of matrix is simpler to position than cut-out quadrants, which have to be individually positioned one relative to the other. The 2D prism structure of the arrangement necessary for this (as shown in FIG. 6) can be inexpensively produced with a known injection molding process and with hot stamping.

The different polarization states can be advantageously imaged onto an image sensor. It is then possible to employ image processing algorithms to average the desired optical channels.

In another embodiment the "simplest" detector might consists of a chessboard arrangement of photosensors which are spatially tilted in relation to each other and which variously polarize the incident beams with the differing angles of tilt, and thereby produce independent optical channels.

The receiver may also be designed as an integrated polarization sensor with a polarization sensor element, where the polarization sensor element has an optoelectronic sensor and a polarization filter structure, such that the optoelectronic sensor and the polarization filter structure are jointly integrated on a semiconductor base. This kind of integrated polarization sensor is shown by, e.g., WO 2009/112174. Known CMOS processes can be used to produce the photosensor. This kind of receiver can be inexpensively produced to have a high resolution. An alternative polarization-sensitive receiver is disclosed by DE 10 2005 031 966 A1.

In the above described embodiments, each described reception element can in principle comprise a plurality of individual reception elements in order to further increase the number of optical channels.

The invention claimed is:

1. A device for measuring the rotating angle of two objects rotating in relation to each other, comprising:
    a transmitter which is assigned to one of the objects and emits light that is either polarized or becomes polarized by means of a polarization filter, and with a polarization-sensitive polarizer such that the transmitter and the polarizer rotate relative to each other as dependent on the rotating angle, and a receiver which measures the luminosity of light passing through the polarizer in order to create a signal that is dependent on the rotating angle,
        wherein a diffusely reflecting element is positioned behind the polarizer,
        wherein a doubly refracting element is positioned in front of the receiver and downstream an imaging lens system, and
        the receiver has a plurality of similar groups of reception elements which detect light of different polarization wherein within each group polarization planes of every two receiving elements are rotated with respect to each other.

2. The device according to claim 1,
wherein
a polarization filter is positioned in front of each of the reception elements, and the polarization planes of the polarization filters are rotated in relation to each other.

3. The device according to claim 2,
wherein
the polarization planes of the reception elements are each rotated by 180°/n in relation to each other, where n is the number of reception elements.

4. The device according to claim 2,
wherein
the receiver has a plurality of groups, each having four reception elements, such that in each case the polarization planes of two of the four reception elements are rotated in relation to each other.

5. The device according to claim 1,
wherein
at least two wedge-shaped optical elements are positioned in front of the receiver, the surfaces of which optical elements are positioned at angle to each other and on which there are positioned polarization filters, where the polarization planes of the polarization filters are rotated in relation to each other.

6. The device according to claim 1,
wherein
a plurality of strips of polarization filters are positioned in front of the receiver, the polarization planes are each rotated relative to one another, on which a plurality of strips of phase plates, the phases of which are each shifted one relative to the next, are arranged transversely to the strips of polarization filters, wherein this configuration is placed on the reverse side of a plurality of wedge-shaped optical elements whose surfaces are positioned at an angle to each other.

7. The device according to claim 1,
wherein
the polarizer has at least one phase plate, which is designed as a $\lambda/4$ plate or a $\lambda/2$ plate.

8. The device according to claim 1,
wherein
the transmitter and the receiver are capable of being acted upon with the same electrical modulation frequency.

9. The device according to claim 1,
wherein
a beam splitter is positioned in the light path.

10. The device according to claim 1,
wherein
two transmitters are provided, which are symmetrically positioned relative to the optical axis of the receiver.

11. The device according to claim 1,
wherein
a number of wedge-shaped optical elements are positioned in front of the receiver that corresponds to the number of reception elements, the surfaces of which optical elements are positioned at angle to each other and on which there are positioned polarization filters, where the polarization planes of the polarization filters are rotated in relation to each other.

12. A process for measuring the rotating angle between two objects rotating in relation to each other comprising:
    a transmitter that is assigned to one of the objects emits light that is either polarized or becomes polarized by means of a polarization filter, such that this light passes through a polarizer and strikes a receiver, and where the transmitter and the polarizer rotate relative to each other as dependent on the rotating angle, and where the luminosity measured by the receiver is plotted as a signal dependent on the rotating angle,
        wherein a diffusely reflecting element is positioned behind the polarizer,
        wherein a doubly refracting element is positioned in front of the receiver and downstream an imaging lens system, and
        the receiver has a plurality of similar groups of reception elements which detect light of different polarization wherein within each group polarization planes of every two receiving elements are rotated with respect to each other.

13. The process according to claim 12,
wherein
reception signals of reception elements having identical polarization planes are averaged.

14. The process according to claim 12,
wherein
reception signals of reception elements having different polarization planes are averaged, while taking into account the phase difference.

* * * * *